United States Patent
Yang et al.

(10) Patent No.: US 10,140,025 B2
(45) Date of Patent: Nov. 27, 2018

(54) MEMORY SYSTEM INCLUDING MEMORY CONTROLLER AND OPERATION METHOD THEREOF

(71) Applicant: SK hynix Inc., Gyeonggi-do (KR)

(72) Inventors: Hyung-Gyun Yang, Gyeonggi-do (KR); Yong-Ju Kim, Gyeonggi-do (KR); Hong-Sik Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 78 days.

(21) Appl. No.: 15/270,755

(22) Filed: Sep. 20, 2016

(65) Prior Publication Data

US 2017/0285942 A1 Oct. 5, 2017

(30) Foreign Application Priority Data

Apr. 5, 2016 (KR) ........................ 10-2016-0041650

(51) Int. Cl.
*G06F 3/06* (2006.01)
*G06F 11/10* (2006.01)

(52) U.S. Cl.
CPC .............. *G06F 3/061* (2013.01); *G06F 3/064* (2013.01); *G06F 3/0619* (2013.01); *G06F 3/0634* (2013.01); *G06F 3/0635* (2013.01); *G06F 3/0659* (2013.01); *G06F 3/0673* (2013.01); *G06F 11/1076* (2013.01)

(58) Field of Classification Search
CPC ...... G06F 3/061; G06F 11/1076; G06F 13/16; G06F 13/1668; G06F 3/0619; G06F 3/0634; G06F 3/0635; G06F 3/064; G06F 3/0659; G06F 3/0673
See application file for complete search history.

(56) References Cited

U.S. PATENT DOCUMENTS

| | | | |
|---|---|---|---|
| 8,966,345 B2 | 2/2015 | Wilkerson et al. | |
| 9,183,078 B1* | 11/2015 | Zhu | G06F 11/10 |
| 9,330,218 B1* | 5/2016 | Chiu | G11C 29/028 |
| 2004/0102948 A1* | 5/2004 | Flores | G01R 31/31703 |
| | | | 703/23 |
| 2012/0311193 A1* | 12/2012 | Erdmann | G11C 16/06 |
| | | | 710/5 |
| 2012/0311197 A1* | 12/2012 | Larson | G11C 7/10 |
| | | | 710/22 |
| 2012/0311231 A1* | 12/2012 | Porterfield | G11C 16/06 |
| | | | 711/103 |
| 2013/0173992 A1* | 7/2013 | Shigeeda | G06F 11/1008 |
| | | | 714/764 |
| 2013/0286752 A1* | 10/2013 | Michioka | G11C 7/1006 |
| | | | 365/189.05 |

(Continued)

FOREIGN PATENT DOCUMENTS

KR 1020140035790 3/2014

*Primary Examiner* — Kyle Vallecillo
(74) *Attorney, Agent, or Firm* — IP & T Group LLP

(57) ABSTRACT

A memory system may include a memory device suitable for storing data requested from a host, and a controller suitable for generating information on the data and transmitting/receiving the data and the information to/from the memory device through first and second data buses, respectively, during a first operation mode, or for transmitting/receiving the data to/from the memory device through one of the first and second data buses based on the data size, during a second operation mode.

17 Claims, 4 Drawing Sheets

(56) References Cited

U.S. PATENT DOCUMENTS

2014/0169092 A1\* 6/2014 Miyamoto .............. G11C 16/26
　　　　　　　　　　　　　　　　　　　　　365/185.09
2016/0321010 A1\* 11/2016 Hashimoto ........... G06F 3/0659
2017/0257298 A1\* 9/2017 Maeda ................ H04L 41/0631

\* cited by examiner

1 Cache Line = 64B data

| valid | 8B data | valid | 8B data | valid | 8B data | valid | 8B data |

MEMORY SYSTEM INCLUDING MEMORY CONTROLLER AND OPERATION METHOD THEREOF

CROSS-REFERENCE TO RELATED APPLICATIONS

The present application claims priority under 35 U.S.C. § 119(a) to Korean Patent Application No. 10-2016-0041650, filed on Apr. 5, 2016, in the Korean Intellectual Property Office (KIPO), the disclosure of which is incorporated herein by reference in its entirety.

BACKGROUND

1. Field

Exemplary embodiments of the present invention relate generally to a memory system and, more particularly, to a memory system including a memory controller which selectively performs an Error Correction Code (ECC) operation according to an operation mode, and an operation method thereof.

2. Description of the Related Art

A memory system is employed in various consumer electronic devices or industrial electronic devices, such as, for example, computers, mobile phones, Portable Digital Assistants (PDAs), digital cameras, game machines and navigation devices as a main or a secondary memory device for storing data. Memory devices constituting a memory system may include volatile memory devices, such as a Dynamic Random Access Memory (DRAM) or a Static Random Access Memory (SRAM), and nonvolatile memory devices, such as a Read Only Memory (ROM), a Mask Read Only Memory (MROM), a Programmable Read Only Memory (PROM), an Erasable Programmable Read Only Memory (EPROM), and Electrically Erasable Programmable Read Only Memory (EEPROM), a Ferroelectric Random Access Memory (FRAM), a Phase-change Random Access Memory (PRAM), a Magnetoresistive Random Access Memory (MRAM), a Resistive Random Access Memory (RRAM) and a Flash memory.

For achieving the capacity and operating speed required by a memory system, memory devices are packaged according to the type of the memory system employing the memory devices. For example, a plurality of memory devices installed in a PC or the like may be packaged in the form of modules integrated on a Printed Circuit Board (PCB), and mounted in the PC through slots. Among the modules packaged for the memory system, one of the most common modules is a Dual In-line Memory Module (DIMM). The DIMM which can be used as a main memory in a computing platform may include a plurality of DRAM devices which are mounted in parallel.

In memory devices, alpha particles generated through decay of a radioactive substance may have an influence on data of a memory cell. In this case, a soft error may occur to change the value of the data. As memory devices are highly integrated and packaged, the occurrence frequency of soft errors has significantly increased due to a radioactive substance used as a packaging material as well as alpha particles which are naturally generated. To lower the occurrence frequency of soft errors, a memory system may employ a technology for improving data reliability, for example, an error correction method.

FIG. 1 schematically illustrates a conventional memory system 100. Referring to FIG. 1, the memory system 100 includes a controller 110 and a memory device 120.

The controller 110 stores write data WD in the memory device 120 in response to a write request inputted from a host, and provides read data RD stored in the memory device 120 to the host in response to a read request inputted from the host. The controller 110 may Include an ECC (error correction code) generation unit 111 and an ECC correction unit 112, in order to support an ECC operation.

During a write operation according to a write request of the host, the ECC generation unit 111 of the controller 110 may generate parity bit data PBD corresponding to write data WD and transmit the write data WD and the parity bit data PBD to the memory device 120.

During a read operation according to a read request of the host, the ECC correction unit 112 of the controller 110 may receive read data RD and parity bit data PBD stored in the memory device 120 in response to the read data RD, and detect and correct an error which occurred in the read data RD. For example, the controller 110 of FIG. 1 may perform an ECC operation. The controller 110 may generate the data PBD for error correction with respect to the data WD/RD exchanged with the host, and store the data WD/RD and the data PBD in the memory device 120.

The memory device 120 may include a data cell region 121 and a redundancy cell region 122. The data cell region 121 may store actual data which are exchanged with the host through the controller 110. The redundancy cell region 122 may store data for correcting an error of the actual data. For example, the memory device 120 may provide a redundancy cell as well as a general cell for one address accessed from the host. The redundancy cell may correspond to an extra space which is not used for storing actual data. The memory device 120 of FIG. 1 may be interfaced with the controller 110 through a specific pin-out. The controller 110 may serve as a memory module capable of supporting an ECC operation, for example, an ECC-DIMM.

When a memory module which requires no ECC operation (because a soft error is unlikely to occur) is interfaced with the controller 110 of FIG. 1, a space which could otherwise be used to store actual data may be wasted by using a redundancy cell region. Furthermore, even when data processing performance is required rather than just data reliability according to an operation, the controller 110 of FIG. 1 unconditionally performs an ECC operation, thereby reducing the entire performance of the memory system 100. Also, employing a separate controller for each type of memory module, may increase a spatial burden in the memory system.

SUMMARY

Various embodiments are directed to a controller which is compatible with various types of memory devices and capable of selectively performing an ECC operation according to an operation, thereby increasing data reliability or data processing performance, and a memory system including the same.

In an embodiment, a memory system may include: a memory device suitable for storing data requested from a host; and a controller suitable for generating information on the data and transmitting/receiving the data and the information to/from the memory device through first and second data buses, respectively, during a first operation mode, and for transmitting/receiving the data to/from the memory device through one of the first and second data buses based on the data size, during a second operation mode.

In an embodiment, a controller may include: a detection unit enabled based on an operation mode and suitable for detecting the size of input data; an address generation unit suitable for generating an internal address based on an input address, based on the operation mode and the detection result of the detection unit; and an ECC processing unit suitable for selectively performing an ECC operation of the data based on the operation mode, wherein the controller transmits/receives the data through the first and second data buses or the first data bus, based on the internal address.

In another embodiment, an operation method of a memory system may include: checking a first or second operation mode based on the logic level of a select signal; generating information on data requested from a host, and transmitting/receiving the data and the information to/from a memory device through first and second data buses, respectively, during the first operation mode based on the check result; and detecting the data size and transmitting/receiving the data to/from the memory device through one of the first and second data buses based on the detection result, during the second operation mode based on the check result.

BRIEF DESCRIPTION OF THE DRAWINGS

The above and other features and advantages of the present invention will become more apparent to those skilled in the art to which the present invention pertains with reference to the attached drawings in which.

DETAILED DESCRIPTION

Figure 1:
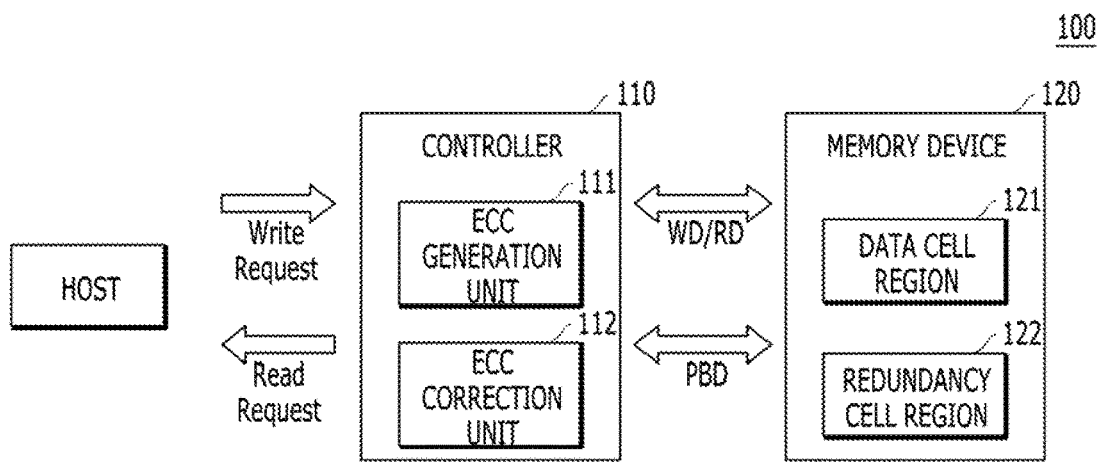
FIG. 1 is a block diagram schematically illustrating a conventional memory system.

Various embodiments of the present invention will be described below in more detail with reference to the accompanying drawings. The invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

The present invention may have diverse modifications and embodiments, and herein, some of the embodiments are taken as examples to describe the present invention. However, it is obvious to those skilled in the art that the embodiments do not limit the concept and scope of the present invention. Also, the constituent elements of the embodiments of the present invention should be understood to include all modifications, substitutes and equivalents.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the embodiments of the present invention will be described in detail with reference to the attached drawings.

Figure 2:
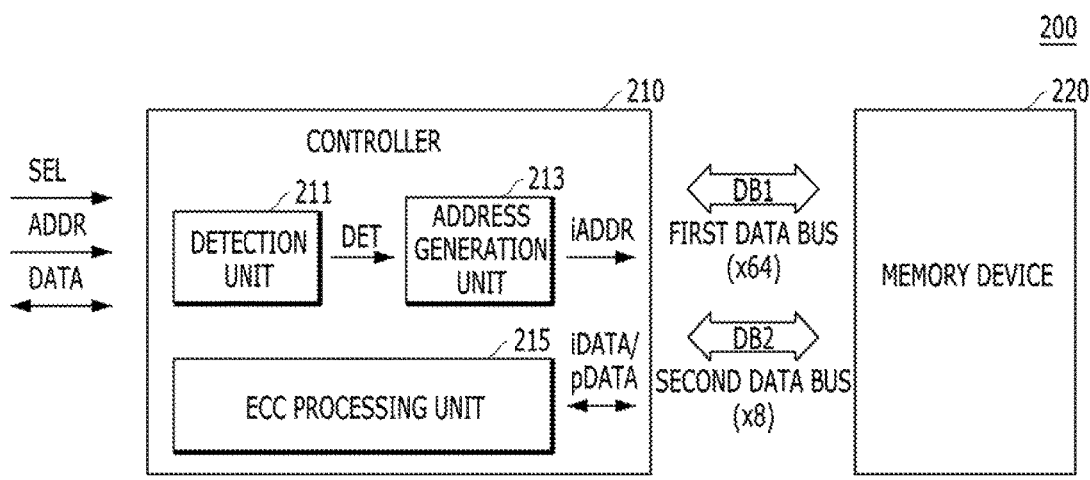
FIG. 2 is a block diagram schematically illustrating a memory system in accordance with an embodiment of the present invention.

FIG. 2 schematically illustrates a memory system 200 in accordance with an embodiment of the present invention. Referring to FIG. 2, the memory system 200 includes a controller 210 and a memory device 220. The controller 210 may include a detection unit 211, an address generation unit 213 and an ECC processing unit 215.

The controller 210 may exchange data with the memory device 220 through a first data bus DB1 and a second data bus DB2. The controller may operate in a first operation mode. During the first operation mode, the controller 210 may generate information on data DATA requested from a host, and transmit/receive the data and the information to/from the memory device 220 through the first and second data buses DB1 and DB2. For example, during the first operation mode, the controller 210 may perform an ECC operation to transmit/receive the data DATA requested from the host and parity data for error correction of the data DATA to/from the memory device 220 through the first and second data buses DB1 and DB2.

The controller 210 may operate in a second operation mode. During the second operation mode, the controller 210 may transmit/receive data DATA requested from the host to/from the memory device 220 through the first and second data buses DB1 and DB2. In the second operation mode, according to the data size, the controller 210 may select one of the first and second data buses DB1 and DB2, in order to transmit/receive the data. A first bandwidth of the first data bus DB1 may be different from a second bandwidth of the second data bus DB2. For convenience of description, FIG. 2 illustrates that the first and second data buses DB1 and DB2 have ×64 and ×8 bandwidths, respectively. However, the present embodiment is not limited thereto.

The detection unit 211 may be enabled in response to a select signal SEL. The select signal SEL may be set according to a result obtained by checking an error which occurs in the memory device 220. During an initial operation of the memory system 200, the controller 210 may write test data to the memory device 220, read the written data, and compare the read data to the test data, thereby checking whether an error occurred in the memory device 220. Based on the comparison result, the controller 210 may set the select signal SEL according to whether an error occurred, and selectively perform an ECC operation according to the set select signal SEL.

When an error is checked not to occur in test data, for example, when the memory device 220 includes memory cells in which a soft error is unlikely to occur, the controller 210 may deactivate the select signal SEL, and thus may not perform an ECC operation. When an error is checked to occur in the test data, for example, when the memory device 220 includes memory cells in which a soft error is likely to occur, the controller 210 may activate the select signal SEL, and thus may perform an ECC operation. In the above embodiment, the case in which the select signal SEL is set by the controller 210 has been taken as an example. However, the present embodiment is not limited thereto. For example, a system to which the memory system 200 is applied or test equipment connected to the memory system 200 during a test mode may check an error which occurs in the memory device 220. Thus, the set select signal SEL may be inputted to the memory system 200.

The detection unit 211 may be enabled in response to deactivation of the select signal SEL. When, the detection unit 211 is enabled, it may monitor the size of data DATA requested from the host. For example, the detection unit 211 may detect an access to fine-granularity data, and generate a detection signal DET according to the detection result. For example, when 8B data corresponding to the bandwidth of the second data bus DB2 is accessed by the host, the detection unit 211 may activate the detection signal DET.

The address generation unit 213 may generate an internal address iADDR based on an address ADDR received from the host in response to the select signal SEL and the detection signal DET. The address generation unit 213 may generate the internal address iADDR by decoding the input address ADDR.

When the select signal SEL is activated, the address generation unit 213 may output the internal address iADDR corresponding to each of the first and second data buses DB1 and DB2, based on the input address ADDR. For example, when the selected signal SEL is activated, the controller 210 may perform an ECC operation in the first operation mode. Thus, the controller 210 may generate parity data of the data DATA requested from the host, and transmit/receive the data DATA and the parity data to/from the memory device 220 through the first and second data buses DB1 and DB2 based on the internal address iADDR outputted from the address generation unit 213.

When the select signal SEL is deactivated, the address generation unit 213 may generate an internal address iADDR in response to the detection signal DET outputted from the detection unit 211. When the detection signal DET is deactivated, it may indicate that an access from the host is not an access to fine-granularity data. Thus, the input address ADDR may be outputted as the internal address iADDR corresponding to the first data bus DB1. On the other hand, when the detection signal DET is activated, it may indicate that an access from the host is an access to fine-granularity data. Thus, the input address ADDR may be mapped to an address corresponding to the second data bus DB2, and outputted as the internal address iADDR. At this time, the address generation unit 213 may set a mapping relation between the input address ADDR and the internal address iADDR corresponding to the second data bus DB2, and store the mapping relation in an address map table (not illustrated).

For example, when the select signal SEL is deactivated, the controller 210 may detect the size of data DATA requested from the host in the second operation mode. The controller 210 may transmit/receive the data DATA to/from the memory device 220 through the first and second data buses DB1 and DB2. In this case, based on the detected data size, the controller 210 may select one data bus between the first and second data buses DB1 and DB2, in order to transmit/receive the data. For example, when fine-granularity data DATA is accessed by the host, the detection unit 211 may activate the detection signal DET. Thus, the second data bus DB2 may be selected, and the controller 210 may transmit/receive the data DATA to/from the memory device 220 through the second data bus DB2. On the other hand, when data DATA having a larger size than fine-granularity data is accessed by the host, the detection unit 211 may deactivate the detection signal DET. Thus, the first data bus DB1 may be selected, and the controller 210 may transmit/ receive the data DATA to/from the memory device 220 through the first data bus DB1.

The ECC processing unit 215 may selectively perform an ECC operation in response to the select signal SEL. When the select signal SEL is activated, the ECC processing unit 215 may generate parity data of the data DATA requested from the host through the ECC operation, and output the data DATA and the parity data as internal data iDATA and parity data pDATA, during a write operation. Furthermore, during a read operation, the ECC processing unit 215 may receive the internal data iDATA and the parity data pDATA corresponding to the internal data iDATA, and detect and correct an error of the data DATA through the ECC operation.

When the select signal SEL is deactivated, the ECC processing unit 215 does not perform an ECC operation, but instead treats the data DATA requested from the host as the internal data iDATA.

The operation of the ECC processing unit 215 in accordance with an embodiment will be described in detail with reference to FIG. 4.

Accordingly, the controller 210 in accordance with an embodiment, may selectively perform an ECC operation according to the operation mode. Thus, the controller 210 may be compatible with various types of memory devices 220, regardless of whether the memory devices 220 employ an ECC operation. For example, the controller 210 may exchange parity data of the data DATA from the host with the memory device 220 through an additional data bus. When an ECC operation is not required, the bus installed for the parity data may also be used for exchanging the data DATA which are actually used, thereby increasing the processing speed and performance of the data DATA.

For example, the controller 210 may detect an access request for data having a size corresponding to the bandwidth of the parity data transmitted between the controller 210 and the memory device 220. Since the bandwidth of the parity data is smaller than the bandwidth of the data which are actually transmitted, the memory system 200 in accordance with the present embodiment may exchange fine-granularity data with the host.

Figures 3, 4:
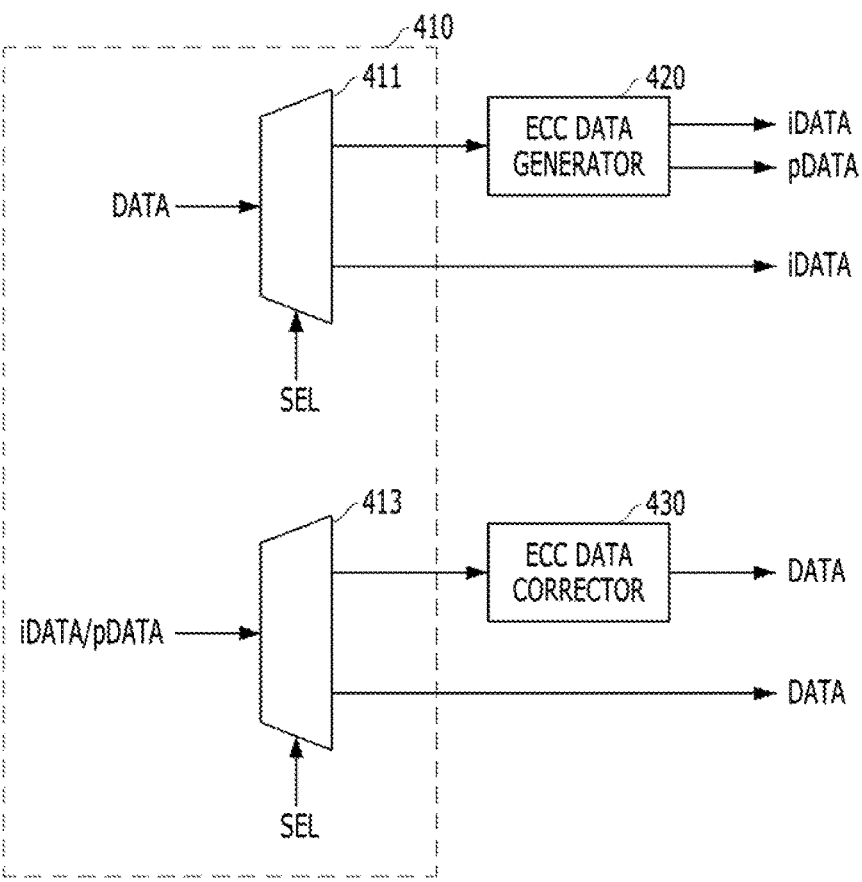
FIG. 3 is a diagram illustrating an example of the data structure transmitted between a host and the memory system of FIG. 2.
FIG. 4 is a block diagram illustrating an example configuration of the ECC processing unit of FIG. 3.

FIG. 3 is a diagram illustrating an example of the data structure transmitted between the host and the memory system 200 of FIG. 2.

FIG. 3 illustrates an example of the data structure transmitted between the memory system 200 and a cache memory (not illustrated) of a system to which the memory system 200 is applied. The cache memory may include a Last-Level Cache (LLC). The data structure in accordance with the present embodiment may not have a valid bit at each one cache line, but include a valid bit at each fine-granularity data within one cache line, for example, each unit corresponding to the transmission bandwidth of parity data. Thus, the cache line size may be maintained as it is, but the valid bit may set at each smaller size.

For convenience of description, FIG. 3 illustrates that when one cache line has a size of 64B data, the data structure has a valid bit at each 8B data. However, the present embodiment is not limited thereto. In such a structure, the cache memory at a higher level than the LLC may read and write 64B data by one cache line, but the main memory at a lower level than the LLC may read and write 8B data as well as 64B data. For example, fine-granularity data can be accessed.

Thus, when a cache miss for smaller data than 8B data occurs in the LLC, only the 8B data may be written back to the main memory, and only new 8B data may be read and stored in the LLC. When a cache miss for data close to 64B data corresponding to one cache line unit occurs, the entire 64B data may be exchanged with the main memory.

The memory system 200 in accordance with the present embodiment may allow an access to fine-granularity data as well as a basic unit of data from the host. When such a data access is detected while an ECC operation is not performed, the controller 210 of the memory system 200 may exchange the corresponding data with the memory device 220 through a data bus installed for an ECC operation. Thus, as the controller 210 processes accesses to the basic unit of data and the fine-granularity data through the respective data buses at the same time, the performance of the memory system 200 can be improved. Furthermore, such data may have spatial locality, and an access request may be successively made on the data. Thus, when an access request for one data is made, the controller 210 may process another data at the same time and previously store the data, which makes it possible to enable a user to expect a pre-fetch effect and performance improvement.

Referring now to FIG. 4, the operation of the ECC processing unit 215 of FIG. 2 will be described in more detail. The ECC processing unit 215 may include an ECC selector 410, an ECC data generator 420 and an ECC data corrector 430. The ECC selector 410 may include first and second selectors 411 and 413, each selector being implemented with multiplexers.

The ECC selector 410 may select and determine whether to perform an ECC operation in response to the select signal SEL. For example, when the select signal SEL is activated, the ECC selector 410 may determine to perform an ECC operation, and when the select signal SEL is deactivated, the ECC selector 410 may determine not to perform an ECC operation.

During a write operation, when the select signal SEL is activated, the first selector 411 may output input data DATA to the ECC data generator 420. The ECC data generator 420 may generate parity data pDATA for detecting and correcting an error of the input data DATA in response to the output of the first selector 411, and output the data DATA and the parity data pDATA as internal data iDATA and parity data pDATA, respectively. When the select signal SEL is deactivated, the first selector 411 may bypass the ECC data generator and output the input data DATA as the internal data iDATA.

During a read operation, when the select signal SEL is activated, the second selector 413 may receive the internal data iDATA and the parity data pDATA from the memory device 220, and output the internal data iDATA and the parity data pDATA to the ECC data corrector 430. The ECC data corrector 430 may detect and correct an error of the internal data iDATA based on the parity data pDATA received from the second selector 413, and output the corrected data DATA of which the error was corrected. When the select signal SEL is deactivated, the second selector 413 may receive the internal data iDATA from the memory device 220, and bypass the ECC data corrector 430 to output the received data as the data DATA.

Figure 5:
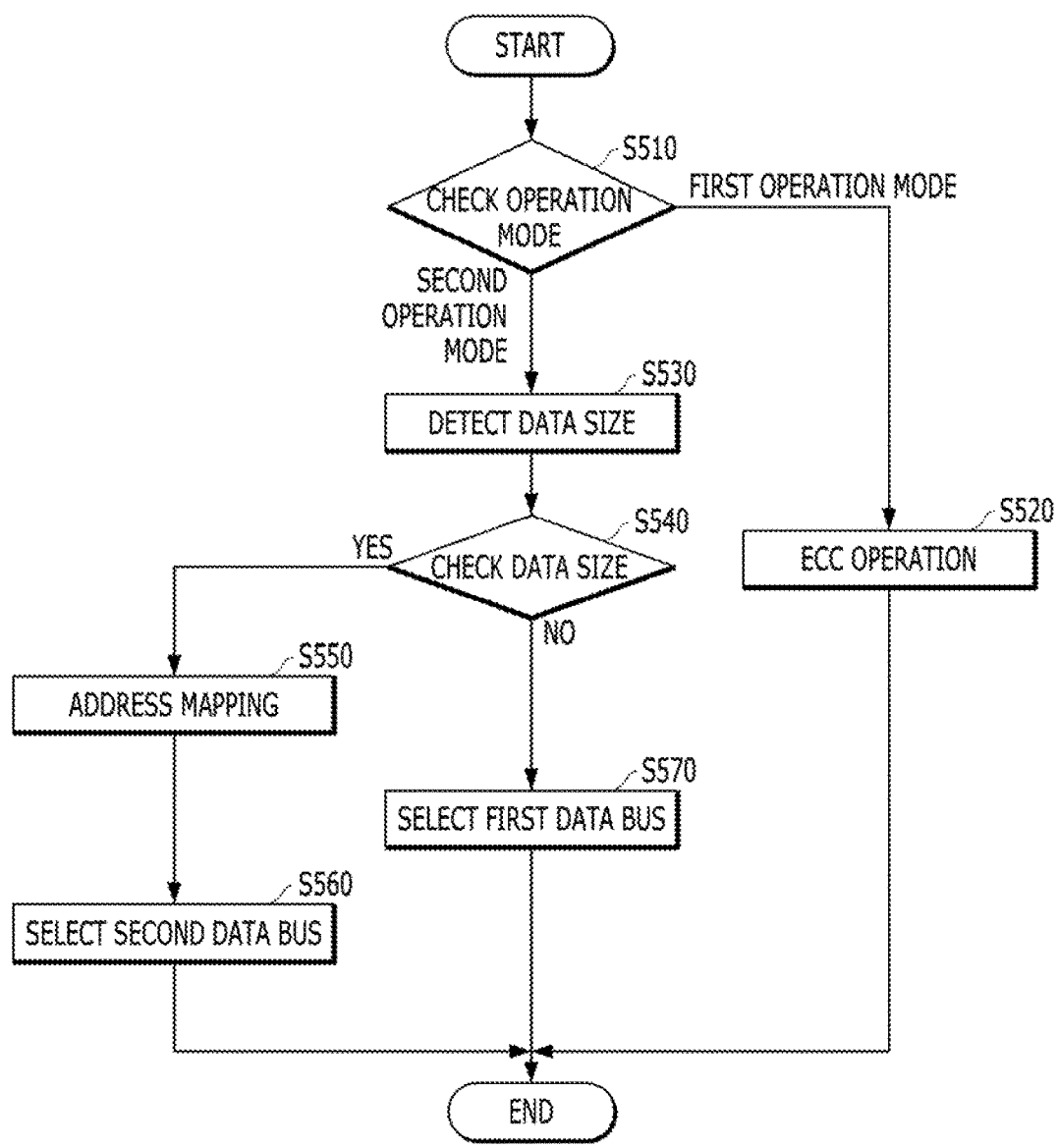
FIG. 5 is a flowchart for describing the overall operations of the memory system of FIG. 2, in accordance with an embodiment of the present invention.

FIG. 5 is a flowchart for describing the overall operations of the memory system 200 of FIG. 2, in accordance with an embodiment of the present invention.

1) Operation Mode Checking (S510)

During an initial operation or test operation of the memory system 200, the controller 210 may check an error which occurs in the memory device 220, and set the select signal SEL based on the check result. The controller 210 may check the operation mode according to the logic level of the select signal SEL. For example, when the select signal SEL is activated, the controller 210 may enter the first operation mode or ECC operation mode. On the other hand, when the select signal SEL is deactivated, the controller 210 may enter the second operation mode or NON_ECC operation mode.

2) ECC Operation (S520).

When it is checked at step S510 that the controller 210 is operated in the first operation mode, the controller 210 may generate information on data requested from a host. For example, the controller 210 may enter the ECC operation mode to perform an ECC operation. The ECC processing unit 215 of the controller 210 may generate parity data of the data requested from the host through the ECC operation, or detect and correct an error of the data requested from the host, based on the parity data. At this time, the controller 210 may transmit/receive the data and the parity data corresponding to the data through the first and second data buses.

3) Data Size Detecting and Checking (S530/S540)

When it is checked at step S510 that the controller 210 is operated in the second operation mode, the detection unit 211 of the controller 210 may detect the data size requested from the host. For example, the detection unit 211 may detect the size of the requested data and compare the detected size to the bandwidth of the second data bus. When the detected data size corresponds to the bandwidth of the second data bus, i.e., when the detected data size is equal to or smaller than the bandwidth of the second data bus (YES), the controller 210 may proceed to step S550. On the other hand, when the detected data size is larger than the bandwidth of the second data bus (NO), the controller 210 may proceed to step S570.

4) Address Mapping and Second Data Bus Selecting (S550/S560)

When it is checked at step 540 that the detected data size is equal to or smaller than the bandwidth of the second data bus (YES), the address of the data may be mapped to an address corresponding to the second data bus. For example, the second data bus may be selected, and the controller 210 may transmit/receive data to/from the memory device 220 through the second data bus.

5) First Data Bus Selected (S570)

When it is checked at step 540 that the detected data size exceeds the bandwidth of the second data bus (NO), the first data bus may be selected, and the controller 210 may transmit/receive the data to/from the memory device 220 through the first data bus.

In the above-described memory system in accordance with the present embodiment, the controller included in the memory system can be variably operated through a simple setting change during an initial operation. The controller can thus selectively perform an ECC operation, thereby improving the processing performance of data while increasing or maintaining the data reliability.

The controller can be compatible with various types of memory devices without changing the hardware, which makes it possible to reduce a burden or cost for constructing the memory system.

In accordance with the described embodiments, the memory system may variably operate the controller of the memory device, so that a region of the memory device can be used variably according to the operation mode. The memory system can increase the data reliability by storing the parity data for an ECC operation in the corresponding region according to the operation mode, or expand the bandwidth of input/output data by storing actual data. Thus, the efficiency of the memory device can be increased, and the compatibility of the controller can be improved.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device suitable for storing data requested from a host; and
   a controller including a detection unit enabled in response to a select signal and suitable for detecting a data size;
   an address generation unit suitable for generating an internal address based on an address received from the host, based on the select signal or a detection result of the detection unit; and
   an ECC processing unit including an ECC selector suitable for selecting whether to perform an ECC operation, in response to the select signal;
   an ECC data generator suitable for generating a parity data of the data by performing the ECC operation in response to an output of the ECC selector; and
   an ECC data corrector suitable for detecting and correcting an error of the data based on the parity data by performing the ECC operation in response to the output of the ECC selector,
   wherein the controller operates in a first operation mode or a second operation mode in response to the select signal which is set during an initial operation of the memory system, and
   wherein the controller is suitable for generating information on the data and transmitting/receiving the data and the information to/from the memory device through first and second data buses, respectively, during the first operation mode, and for transmitting/receiving the data to/from the memory device through one of the first and second data buses based on the data size, during the second operation mode.

2. The memory system of claim 1, wherein during the first operation mode, the controller performs the error correction code (ECC) operation and generates a parity data for error detection and correction of the data as the information on the data.

3. The memory system of claim 1, wherein during the second operation mode, the controller detects the data size, and selects the first or the second data bus corresponding to the detected data size.

4. The memory system of claim 1, wherein when the select signal is activated, the address generation unit generates the internal address corresponding to the first and second data buses, and
   when the select signal is deactivated, the address generation unit generates the internal address corresponding to the first or second bus, based on the detection result of the detection unit.

5. The memory system of claim 4, wherein when the data size is equal to or less than a bandwidth of the second data bus, the address generation unit outputs the internal address corresponding to the second data bus, and
   when the data size is larger than the bandwidth of the second data bus, the address generation unit outputs the internal address corresponding to the first data bus.

6. The memory system of claim 1, wherein the memory system exchanges the data with the host, based on a data structure having a valid bit at each size corresponding to a bandwidth of the second data bus.

7. The memory system of claim 1, wherein the controller writes test data to the memory device, reads the written data, compares the read data to the test data to check whether an error occurs, and sets the select signal based on the check result.

8. A controller comprising:
   a detection unit enabled based on an operation mode and suitable for detecting a size of input data;
   an address generation unit suitable for generating an internal address based on an input address, wherein the internal address corresponds to first and second data buses, respectively, or one of the first and second data buses based on the operation mode and a detection result of the detection unit; and
   an ECC processing unit including an ECC selector suitable for selecting whether to perform an ECC operation, in response to a select signal;
   an ECC data generator suitable for generating a parity data of the data by performing the ECC operation in response to an output of the ECC selector; and
   an ECC data corrector suitable for detecting and correcting an error of the data based on the parity data by performing the ECC operation in response to the output of the ECC selector,
wherein the ECC processing unit is suitable for selectively performing an ECC operation of the data based on the operation mode,
wherein the controller transmits/receives the data through the first and second data buses, respectively, or the one of the first and second data buses, based on the internal address.

9. The controller of claim 8, wherein the detection unit detects the size of input data in response to the select signal which is activated based on the operation mode, and compares the detected data size to a bandwidth of the second data bus.

10. The controller of claim 9, wherein when the select signal is activated, the address generation unit generates the internal address corresponding to the first and second data buses, based on the input address, and
when the select signal is deactivated, the address generation unit generates the internal address corresponding to the one of the first and second data buses which is selected based on the detection result of the detection unit, based on the input address.

11. The controller of claim 10, wherein when the detection result of the detection unit indicates that the data size is equal to or less than the bandwidth of the second data bus, the address generation unit outputs the internal address corresponding to the second data bus, and the data are transmitted/received through the second data bus, and
when the detection result of the detection unit indicates that the data size is larger than the bandwidth of the second data bus, the address generation unit outputs the internal address corresponding to the first data bus, and the data are transmitted/received through the first data bus.

12. The controller of claim 9, wherein when the select signal is activated, the ECC processing unit performs the ECC operation to generate a parity data of the data or to detect and correct an error of the data based on the parity data, and the data and the parity data are transmitted/received through the first and second data buses, respectively.

13. An operation method of a memory system, comprising: checking a first or second operation mode of a controller which includes a detection unit enabled in response to a select signal and suitable for detecting a data size;
an address generation unit suitable for generating an internal address based on an address received from a host, based on the select signal or a detection result of the detection unit; and
an ECC processing unit including an ECC selector suitable for selecting whether to perform an ECC operation, in response to the select signal;
an ECC data generator suitable for generating a parity data of the data by performing the ECC operation in response to an output of the ECC selector; and
an ECC data corrector suitable for detecting and correcting an error of the data based on the parity data by performing the ECC operation in response to the output of the ECC selector based on a logic level of the select signal;
generating information on data requested from the host, and transmitting/receiving the data and the information to/from a memory device through first and second data buses, respectively, during the first operation mode based on the check result; and
detecting a data size and transmitting/receiving the data to/from the memory device through one of the first and second data buses based on the detection result, during the second operation mode based on the check result.

14. The operation method of claim 13, wherein the generating of the information and the transmitting/receiving of the data and the information comprises:
generating a parity data of the data by performing the ECC operation on the data;
detecting and correcting an error of the data by performing the ECC operation based on the parity data; and
transmitting/receiving the data and the parity data through the first and second data buses, respectively.

15. The operation method of claim 13, wherein the detecting of the data size and the transmitting/receiving of the data comprises:
detecting the data size and comparing the detected data size to a bandwidth of the second data bus;
transmitting/receiving the data through the second data bus, when the data size is equal to or less than the bandwidth of the second data bus; and
transmitting/receiving the data through the first data bus, when the data size is larger than the bandwidth of the second data bus.

16. The operation method of claim 15, wherein the transmitting/receiving of the data through the second data bus comprises mapping an address of the data to an address corresponding to the second data bus.

17. The operation method of claim 13, wherein the memory system exchanges the data with the host, based on a data structure having a valid bit at each size corresponding to a bandwidth of the second data bus.

* * * * *